(12) United States Patent
Kramlich et al.

(10) Patent No.: US 12,276,275 B2
(45) Date of Patent: Apr. 15, 2025

(54) COMPRESSOR SYSTEM AND METHOD FOR CONTROLLING A COOLING DEVICE OF A COMPRESSOR SYSTEM

(71) Applicant: KNORR-BREMSE SYSTEME FÜR SCHIENENFAHRZEUGE GMBH, Munich (DE)

(72) Inventors: Adrian Kramlich, Munich (DE); Stefan Lange, Munich (DE)

(73) Assignee: KNORR-BREMSE SYSTEME FÜR SCHIENENFAHRZEUGE GMBH (DE)

( * ) Notice: Subject to any disclaimer, the term of this patent is extended or adjusted under 35 U.S.C. 154(b) by 200 days.

(21) Appl. No.: 18/009,496

(22) PCT Filed: May 21, 2021

(86) PCT No.: PCT/EP2021/063638
§ 371 (c)(1),
(2) Date: Dec. 9, 2022

(87) PCT Pub. No.: WO2021/249746
PCT Pub. Date: Dec. 16, 2021

(65) Prior Publication Data
US 2023/0235734 A1    Jul. 27, 2023

(30) Foreign Application Priority Data
Jun. 9, 2020 (DE) ............ 10 2020 115 300.7

(51) Int. Cl.
*F04B 49/06* (2006.01)
*F04B 39/06* (2006.01)

(52) U.S. Cl.
CPC ............ *F04B 49/065* (2013.01); *F04B 39/06* (2013.01)

(58) Field of Classification Search
CPC .............................. F04B 49/065; F04B 39/06
USPC ........................................................ 417/288
See application file for complete search history.

(56) References Cited

U.S. PATENT DOCUMENTS

| | | | |
|---|---|---|---|
| 2004/0096333 | A1 | 5/2004 | Nichol et al. |
| 2004/0244393 | A1 | 12/2004 | Lucas et al. |
| 2011/0107790 | A1 | 5/2011 | Dunn et al. |
| 2013/0129480 | A1 | 5/2013 | Hirata |

(Continued)

FOREIGN PATENT DOCUMENTS

| | | |
|---|---|---|
| DE | 10163994 A1 | 7/2003 |
| DE | 10228355 A1 | 1/2004 |

(Continued)

OTHER PUBLICATIONS

International Search Report corresponding to PCT/EP2021/063638 dated Jun. 24, 2021.

*Primary Examiner* — Charles G Freay
*Assistant Examiner* — Benjamin Doyle
(74) *Attorney, Agent, or Firm* — Barnes & Thornburg LLP (57) ABSTRACT

A compressor system including a compressor, a cooling device and a control apparatus, wherein the control apparatus is configured to control the cooling device independently of the operation of the compressor and to be capable of dynamically modifying a control parameter ($T_{air}$, $T_{oil}$) of an actuator and/or the actuator for the actuation of the cooling device.

12 Claims, 2 Drawing Sheets

(56) References Cited

U.S. PATENT DOCUMENTS

| | | | |
|---|---|---|---|
| 2015/0330287 A1 | 11/2015 | Dickerson | |
| 2017/0002804 A1 | 1/2017 | Kipp et al. | |
| 2018/0134123 A1* | 5/2018 | Herbolzheimer | B60H 1/32284 |
| 2018/0320927 A1* | 11/2018 | Yamamoto | F04B 53/08 |
| 2019/0039589 A1 | 2/2019 | Becker et al. | |
| 2019/0048865 A1 | 2/2019 | Kipp et al. | |
| 2019/0277276 A1* | 9/2019 | Cain | F04B 49/06 |
| 2020/0062074 A1* | 2/2020 | MacNeille | B60H 1/008 |

FOREIGN PATENT DOCUMENTS

| | | | |
|---|---|---|---|
| DE | 60115671 T2 | 7/2006 | |
| DE | 102013113557 A1 | 6/2015 | |
| DE | 102016100705 A1 | 7/2017 | |
| DE | 102016105145 A1 | 9/2017 | |
| JP | 2003254253 A | 9/2003 | |
| JP | WO2018025368 * | 4/2019 | F04B 49/06 |

\* cited by examiner

COMPRESSOR SYSTEM AND METHOD FOR CONTROLLING A COOLING DEVICE OF A COMPRESSOR SYSTEM

CROSS REFERENCE AND PRIORITY CLAIM

This patent application is a U.S. National Phase of International Patent Application No. PCT/EP2021/063638 filed May 21, 2021, which claims priority to German Patent Application No. 10 2020 115 300.7, the disclosure of which being incorporated herein by reference in their entireties.

FIELD

Disclosed embodiments relate to a compressor system, a method for controlling a cooling device of a compressor system and a computer program product provided for that purpose.

BACKGROUND

Compressors are used in a variety of technical applications. In modern rail vehicles, as an example of such an area of application, the reduction of noise emissions is becoming increasingly important. At the same time, the temperature balance of the compressor must be guaranteed over the entire temperature spectrum for rail vehicles, for example between −40° C. and +50° C., and also in confined installation spaces.

Conventional compressor systems of compressed air compressors in rail vehicles comprise a compressor and, if necessary, an aftercooler or, as in the case of two-stage reciprocating compressors, an intermediate cooler and an aftercooler. The compressor can be designed as a piston machine or as a rotary compressor, for example as a screw compressor or a scroll compressor, and is predominantly air-cooled. The air cooling is carried out with one or more fans, which is/are operated by mechanical coupling or signaling coupling corresponding to the compressor revolution rate.

At high ambient temperatures and under unfavorable room conditions, however, the compressor often overheats. Conversely, due to this direct coupling, there is a risk of internal ice formation or condensate accumulation and associated operating restrictions as well as increased wear and increased corrosion due to the high cooling capacity introduced at low intake temperatures and short operating times. This results in a conflict of objectives that cannot be resolved with conventional cooling systems due to the coupling of the cooling fan revolution rate to the compressor revolution rate.

In addition, the operation of the cooling device can influence the temperature balance of the compressor system in such a way that optimized conditions result for a system component, while overall unfavorable operating conditions are achieved.

SUMMARY

In view of the foregoing, disclosed embodiments provide a compressor system, a method for controlling a cooling device of a compressor system and a computer program product for carrying out the method that allows improved cooling of the compressor system.

BRIEF DESCRIPTION OF THE FIGURES

Disclosed embodiments are explained below in more detail based on an embodiment using the attached figures. In the figures.

DETAILED DESCRIPTION

In accordance with disclosed embodiments, a compressor system has a compressor, a cooling device and a control device, wherein the control device is configured to actuate the cooling device independently of the operation of the compressor and to dynamically adjust a control variable of an actuator and/or the actuator for actuating the cooling device.

The cooling device of the compressor system can thus be operated independently of a compressor revolution rate matched to the cooling capacity required for optimal operation. This can be implemented via a separate signaling actuation of an independent energetic drive of the cooling device and/or, for example, with mechanical coupling of the cooling device to the compressor by the use of switchable ratios. A separate signaling actuation of the cooling device also offers the advantage that in such a case the actuation is also independent of whether the compressor is basically switched on or off. Depending on the actuation stages/variants to be provided, mechanical coupling may also no longer be manageable due to the complexity involved.

A separate signaling actuation does not necessarily require separate control devices for the compressor and the cooling device but is directed to independent signal transmission and independent signal content. Such independence is not limited by the fact that compressor operating conditions may also be taken into account when generating the signal to actuate the cooling device. For example, a basically independent actuation can take place, wherein at least a basic operation of the cooling device is provided from a certain compressor revolution rate.

The operation of the cooling device can also be carried out by use of a separate signaling actuation, wherein in operating states in which the compressor is operated in parallel with the cooling device, a mechanical coupling to the compressor revolution rate can support the operation of the cooling device. In this sense, the actuation of the cooling device is still independent, wherein the coupling is merely a selectable drive function or drive support. In other words, for example, the cooling device can also be mechanically coupled to the compressor in certain operating states or in the case of a drive line corresponding to the compressor revolution rate, and can thus be driven by it in order to reduce energy consumption. Nevertheless, the compressor system offers the possibility of independent actuation.

Due to the actuation of the cooling device, which is independent of the operation of the compressor, the cooling device can be switched on and off as required. As a result, overheating and/or condensate accumulation can be avoided or at least reduced. In particular, such a cooling device can be used preventively in recurring operating scenarios.

However, the actuation of the cooling device which is independent of the operation of the compressor may be subject to various, sometimes contradictory optimization criteria, the weighting of which does not have to be constant depending on the operating condition. Accordingly, the control device is configured to be able to dynamically adjust a control variable of an actuator and/or the actuator for actuating the cooling device.

The control variables are the variables based on which the actuator actuates the cooling device or influences the controlled variable. In this context, a dynamic adjustment of the control variable of an actuator is understood to mean that with at least two available control variables, the selection of one, the other or both control variables is adaptable. The selection of the control variable or control variables to be used may be conditioned by their respective value and/or linked to certain operating states.

The dynamic adjustment of the actuator, which is alternative or supplementary to the dynamic adjustment of the control variable, then relates to the actual conversion of the control variable or control variables to the controlled variable. If, for example, only one control variable is selected in advance, the controlled variable can be influenced by the adjustment of the actuator, depending on the value of the control variable and/or the respective operating state. The dynamic adjustment does not refer to the possible change of the controlled variable as a function of the control variable according to a given transfer function, but to the adjustment of the transfer function itself.

For example, several variables can be used for the actuation of the cooling device, wherein the control device, for example, selects only one of the variables as the control variable and the transfer function of the actuator is kept constant. In another example, all variables are used as control variables as it were, but depending on the value, at least one of the control variables adjusts the transfer function. Corresponding combinations of the adjustment of the control variable and the actuator should also be mentioned as examples.

Thus, the compressor system, in particular the compressor itself, can be operated according to the control variables at the optimal operating point. This not only has a positive effect on the efficiency and service life of the compressor system, but can also avoid overloading downstream components, which can also increase their efficiency and service life.

The compressor system can be used in an advantageous manner in particular for rail vehicles.

In one embodiment, the control device is configured to specify a cooling fluid volume flow rate, in particular a cooling air volume flow rate, as a controlled variable.

The cooling device thus has an adjustment device that can vary a fluid volume provided per unit of time for cooling. For example, a flow rate of a fluid can be controlled accordingly for this purpose by means of a valve position or a generation quantity can be controlled by means of a drive power, such as a flow rate according to a fan revolution rate. Due to its good availability, the use of air as a coolant is a simple and cost-effective solution. Even if air is not used solely as a coolant, cooling can be easily adjusted at least by varying the air flow rate.

Alternatively or additionally, the cooling fluid temperature and/or switch-on and switch-off times of the cooling device can be used as a controlled variable.

In one version, the control device is configured to receive at least two control variables, wherein one control variable can be defined as the primary control variable and the other control variable as the secondary control variable for actuating the cooling device depending on the primary control variable and/or the secondary control variable.

The control variable which is to be used first according to a predetermined control logic of the control device is defined as the primary control variable. If such a primary control variable does not require any actuation depending on the predetermined conditions, the secondary control variable is considered separately and/or again with reference to the primary control variable. In other words, the primary control variable is assessed first in time and thus always, while the secondary control variable only has to influence the actuation if the primary control variable alone does not cause the actuation.

On the one hand, this requires an actuation of the cooling device optimized to at least two control variables, wherein a first weighting by selecting a primary control variable and associated decision criteria can simplify the control device in such a way that two variables do not have to be constantly evaluated or the transfer functions of the actuators do not have to take the respective evaluation results into account. The transfer functions can, for example, be cascaded. At the same time, this means that primary control variables and secondary control variables do not have to be recorded constantly but can be recorded only as required. For example, no secondary control variables need to be recorded as long as the primary control variable by itself requires actuation of the cooling device. This reduces the energy requirement as well as the amount of data to be transmitted.

In a development, the control device is configured to actuate the cooling device depending on the primary control variable if the primary control variable is greater than a predetermined upper primary control variable limit, and/or to actuate the cooling device depending on the secondary control variable if the primary control variable is less than or equal to a predetermined upper primary control variable limit and at the same time the secondary control variable is greater than a predetermined secondary control variable limit, and/or to actuate the cooling device (40) depending on the primary control variable and the secondary control variable if the primary control variable is less than or equal to the predetermined upper primary control variable limit and the secondary control variable is less than the predetermined secondary control variable limit.

The primary control variable thus represents a variable which requires actuation of the cooling device regardless of further conditions in a case in which the cooling device is to be controlled depending on the primary control variable if the primary control variable is greater than a predetermined upper primary control variable limit. In other words, using the variable represented by the primary control variable, a state is considered in which the cooling device would not be actuated sufficiently based on other variables.

If a correspondingly predetermined upper primary control variable limit is exceeded, the cooling device is actuated depending on the primary control variable as already mentioned. For this purpose, depending on the respective values of the primary control variable, either the actuator or its transfer function can be adjusted and/or the primary control variable is directly included in the transfer function.

Alternatively or additionally, the control device according to the above embodiment may actuate the cooling device depending on the secondary control variable if the primary control variable is less than or equal to a predetermined upper primary control variable limit and at the same time the secondary control variable is greater than a predetermined secondary control variable limit.

Accordingly, the control device takes into account both the primary control variable and the secondary control variable, wherein however the latter is decisive for the actuator or the transfer function. In a supplementary variant cascaded actuation of the cooling device can thus be spoken of, while an alternative variant can be used in combination with other cooling devices, for example.

Furthermore, alternatively or additionally, the control device according to the above embodiment can actuate the cooling device depending on the primary control variable and the secondary control variable, namely if the primary control variable is less than or equal to the predetermined upper primary control variable limit and the secondary control variable is also less than the predetermined secondary control variable limit. Thus, the control device takes into account both the primary control variable and the secondary control variable here too, wherein however both control variables are decisive for the actuator or the transfer function.

In particular, the control device is configured to actuate the cooling device such that the cooling device is operated at maximum power when the primary control variable is greater than a critical upper primary control variable limit, which is in particular greater than the predetermined upper primary control variable limit.

Accordingly, the actuator is adjusted in such a way that the controlled variable corresponds to the maximum power of the cooling device. The maximum power of the cooling device may correspond to the maximum power which can technically be provided by the cooling device or a predetermined maximum power. A predetermined maximum power may be, for example, a power that is less than the power which can technically be provided but is preferable for long-term operation or is considered sufficient even with lower energy consumption.

In principle, the critical upper primary control variable limit may be equal to the predetermined upper primary control variable limit, wherein the cooling device is then operated at maximum power when the predetermined upper primary control variable limit is exceeded. This can be undesirable both for efficiency reasons and due to disadvantages in the case of excessive cooling power, so that the critical upper limit is in particular greater than the predetermined upper primary control variable limit.

Alternatively or additionally, the control device is configured to actuate the cooling device such that the cooling device is operated at the maximum until reaching a power proportional to the power for the primary control variable if the primary control variable is greater than the predetermined upper primary control variable limit.

The controlled variable can thus result from the primary control variable multiplied by a proportionality factor, i.e., according to the formula controlled variable=a*primary control variable with a as the primary control variable proportionality factor. If the controlled variable corresponds to the power of the cooling device, the applicability of the formula is limited by the maximum power. When the maximum power is reached, the actuator or the transfer function can then be adjusted so that the controlled variable corresponds to the maximum power. However, a corresponding logic can also be stored in the control path for converting the controlled variable into the variable to be controlled, so that the power is limited to the maximum power for controlled variables greater than the maximum power.

According to a particular embodiment, a critical upper primary control limit which is greater than the upper primary control variable limit is additionally stored in the controller. Then the cooling device is operated at a power proportional to the primary variable until the critical upper primary control variable limit is exceeded, and then at maximum power when it is exceeded. If the critical upper primary control limit is exceeded, the actuator is thus adjusted for converting the respective control variable to the controlled variable and the primary control variable is no longer included in the transfer function.

The operation of the cooling device with power less than the maximum power allows the reduction of energy consumption as well as noise emissions. At the same time, low cooling can also reduce other adverse effects, such as increased water absorption at lower temperatures and the associated risk of corrosion. The actuation thus enables operation of the cooling device adapted to the operating conditions.

Also alternatively or additionally, the control device is configured to actuate the cooling device such that the cooling device is operated at most with a power proportional to the secondary control variable until reaching its maximum power, if the primary control variable is less than or equal to the predetermined upper primary control variable limit and the secondary control variable is greater than the predetermined secondary control variable limit, or if the secondary control variable is less than or equal to the predetermined secondary control variable limit and the primary control variable is greater than or equal to a predetermined lower primary control variable limit.

The controlled variable can thus result from the secondary control variable multiplied by a proportionality factor, i.e. according to the formula controlled variable=b*secondary control variable, with b as the secondary control variable proportionality factor. Here too, the maximum power must be taken into account with the power of the cooling device as the controlled variable. If, for example, the actuation of the cooling device by means of the primary control variable is carried out when the upper primary control limit is exceeded, it is to be expected that the control device is designed in such a way that the controlled variable depending on the secondary control variable does not exceed a controlled variable depending on the primary control variable, so that in the event of actuation depending on the secondary control variable, the maximum power is not required. A corresponding design of the control device can then correspond to the condition b*maximum secondary control variable<a*minimum primary control variable. However, a different maximum power can also be provided for actuation depending on the secondary control variable than for actuation by means of the primary control variable. A distinction would then have to be made here between a maximum secondary control variable power and a maximum primary control variable power, which would have to be applied to the maximum power in each case.

According to the above actuation, the cooling device is operated in any case at most with power proportional to the secondary control variable until its maximum power is reached if the primary control variable is less than or equal to the predetermined upper primary control variable limit and the secondary control variable is between the predetermined upper primary control variable limit and a predetermined secondary control variable limit. If the predetermined secondary control variable value is reached or undercut, the value of the primary control variable is decisive for the actuator. The adjustment of the actuator to provide power proportional to the secondary control variable requires the primary control variable to be greater than or equal to a predetermined lower primary control variable limit here.

The adjustment of the actuator thus takes into account the primary control variable as well as the secondary control variable.

Here too, the advantages already mentioned advantages result from actuation of the cooling device adapted to the respective operating conditions.

Furthermore, alternatively or additionally, the control device is configured to actuate the cooling device such that the cooling device is switched off if the secondary control variable is less than or equal to the predetermined secondary control variable limit and the primary control variable is less than a predetermined lower primary control variable limit.

Reaching or falling below a predetermined secondary control variable limit and falling below the lower primary control variable limit indicates that there is no requirement to operate the cooling device with regard to either the secondary control variable or the primary control variable and that it can therefore be switched off in order to save energy or reduce noise emissions.

In one embodiment, the compressor system comprises at least one air temperature detection unit which detects an air temperature, and at least one oil temperature detection unit which detects an oil temperature, which have signaling connections to the control device, wherein the control device is configured to define the detected air temperature as the primary control variable and the detected oil temperature as the secondary control variable and/or vice versa.

The air temperature and the oil temperature can be detected directly or indirectly by means of the air temperature detection unit and the oil temperature detection unit. Indirect detection can be carried out, for example, via the detection of a respective component temperature corresponding to the air temperature or oil temperature.

The definition of the air temperature as the primary control variable makes it possible to consider the air temperature as a critical variable as a primary criterion. The oil temperature is used as a secondary control variable, since too high an oil temperature can cause aging of the oil and too low an oil temperature can cause increased water absorption. If there is no actuation requirement with regard to the air temperature as the primary control variable, the temperature range for the oil temperature can thus be optimized as a secondary control variable. Overall, this results in actuation of the cooling device for an optimal temperature range adapted to the respective operating states. In this way, the risk of corrosion and component wear of the compressor system can be reduced. At the same time, short switch-on times of the compressor are also less problematic.

Alternatively, however, the oil temperature can be defined as the primary control variable and the air temperature as the secondary control variable. This can be advantageous if, for example, the absorption of water by the oil or the aging of the oil is to be envisaged as a significant critical variable. Accordingly, the assignment of the oil temperature as the primary control variable and the air temperature as the secondary control variable and vice versa can also be adaptable, for example depending on predetermined operating states or other specifications or input options.

The detection of the secondary control variable or the evaluation of the secondary control variable does not have to take place at the same time as the detection or evaluation of the primary control variable. For example, the detection or evaluation of the control variable may only be provided if the primary control variable is not greater than an upper primary control variable.

In particular, the air temperature detection unit and the oil temperature detection unit are arranged at a respective output of the compressor.

The air temperature detection unit is therefore located in an area of the egress of the air from the compressor. The oil temperature unit measures the oil temperature of the oil in the area of the oil sump and is located, for example, in an area of the egress of the oil from the oil sump. The detection thus takes place in each case at the locations of the expected maximum temperatures of the air or the oil. Alternatively or additionally, the air temperature detection unit can also detect a temperature of the air exiting an aftercooler downstream of the compressor. Likewise, the oil temperature detection unit can detect an oil temperature after passing through a downstream internal and/or external oil circuit.

In one version, the compressor system is designed as an oil-lubricated compressor, in particular as an oil-lubricated screw compressor.

Oil-lubricated compressors in particular must cover a wide range of climatic conditions, such as an operating range of −40° C. to +50° C., and the cooling requirements during operation can vary greatly. For example, utilization is also an important factor here. The process air and the oil must be taken into account as media to be cooled, although optimization conflicts may occur. On the one hand, the oil should reach operating temperature as quickly as possible, but at the same time the air temperature at the cooler outlet must not rise too far. Variable cooling helps here in particular to ensure the best possible operation.

In a further aspect, the invention relates to a method for controlling a cooling device of a compressor system described above, having the operations of:
  detection of at least two control variables and
  control of the cooling device (40) on the basis of the detected control variables,
    wherein the control variable for the actuator and/or the actuator for actuating the cooling device is dynamically adjusted depending on the detected control variables.

The characteristics and advantages of the method are analogous to the versions of the compressor system.

In one embodiment of the method, the control device defines the one detected control variable as the primary control variable and the other detected control variable as the secondary control variable and controls the cooling device depending on the primary control variable if the primary control variable is greater than a predetermined upper primary control variable limit, and controls the cooling device depending on the secondary control variable if the primary control variable is less than or equal to a predetermined upper primary control variable limit and the secondary control variable is greater than a predetermined secondary control variable limit, and/or controls the cooling device depending on the primary control variable and the secondary control variable if the primary control variable is less than or equal to the predetermined upper primary control variable limit and the secondary control variable is less than the predetermined secondary control variable limit.

Here too, reference is made to the corresponding information about the compressor system.

In particular, the control device controls the cooling device as follows:
  (a) the cooling device is operated at maximum power if the primary control variable is greater than a critical upper primary control variable limit, which is in particular greater than the predetermined upper primary control variable limit;

(b) the cooling device is operated at most at a power proportional to the primary control variable until the maximum power is reached if the primary control variable is greater than the predetermined upper primary control variable limit;

(c) the cooling device is operated at most with a power proportional to the secondary control variable until its maximum power is reached;

if the primary control variable is less than or equal to the predetermined upper primary control variable limit and the secondary control variable is greater than the predetermined secondary control variable limit, or if the secondary control variable is less than or equal to the predetermined secondary control variable limit and the primary control variable is greater than or equal to a predetermined lower primary control variable limit, and/or (d) the cooling device will be switched off if the secondary control variable is less than or equal to the predetermined secondary control variable limit and the primary control variable is less than a predetermined lower primary control variable limit.

The relevant explanations of the compressor system also apply to the above embodiment of the method.

Furthermore, the invention relates to a computer program product having a program code stored on a machine-readable carrier, which is designed, when executed on a data processing device, to cause the data processing device to carry out the method described above.

Among other things, the computer program product makes it easy to retrofit signal-actuated cooling devices of conventional compressor systems.

Figure 1:
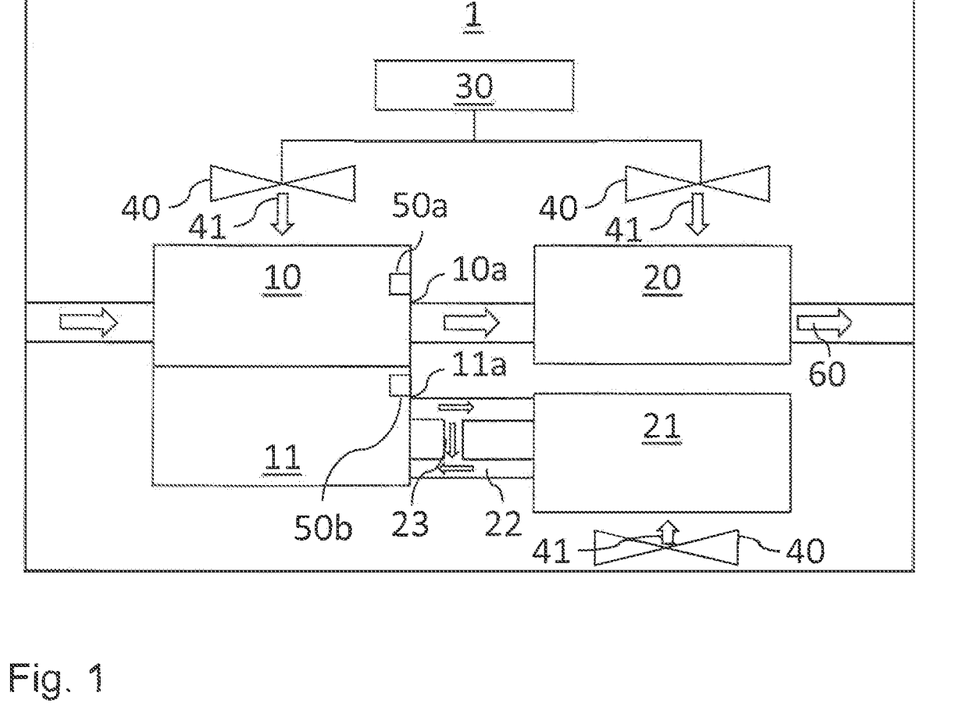
FIG. 1 shows in detail a schematic representation of a compressor system according to a first embodiment of the invention.

FIG. 1 shows a schematic representation of a compressor system 1, which is designed here by way of example as an oil-lubricated screw compressor system, and comprises a compressor 10, here a screw compressor, and an aftercooler 20. The air to be compressed is first passed through the compressor 10 according to the arrows which simulate the process air flow 60, is compressed there and then passes through the aftercooler 20. In addition, the compressor system 1 comprises a control device 30, which actuates the cooling device, which in the present embodiment comprises the fans 40. The fans can each generate a cooling air flow rate 41 during operation, which is directed via a fan 40 primarily to the compressor 10 and/or to the compressor outlet, via a fan 40 primarily to the aftercooler outlet and/or the aftercooler 20 and via a fan 40 primarily to an oil cooler 21 described later and/or the outlet thereof. The control device 30 is designed here such that it can adjust both the switch-on and switch-off times of the fans 40 and the cooling air volume flow rate of the fans 40 by controlling the revolution rate of the fan, which corresponds to the power of the fan. The power of the fan is controlled in the same way. Alternatively, it may also be envisaged to provide the controlled variables of the respective fans 40 differently, for example to select the transfer functions and/or any proportionality factors used differently. In another embodiment, only one fan 40 may be provided as a cooling device.

The compressor 10 also comprises an oil sump 11, wherein the oil can pass through an internal oil circuit 23 and an external oil circuit 22, which is passed through the oil cooler 21. The routing of the oil via the external oil circuit 22 may be coupled to the operation of the cooling device or the fan 40. For example, the oil is only passed through the external oil circuit if a primary control variable is greater than a predetermined upper primary control variable limit or a secondary control variable is greater than a predetermined secondary control variable limit, as will be explained later.

At the outlet of the process air 60 from the compressor 10, an air temperature detection unit 50a is arranged, which detects the air temperature TLuft at the output 10a from the compressor 10. Alternatively, the air temperature detection unit can also be provided, for example, at the outlet of the aftercooler 20. In addition, at the outlet 11a of the oil sump 11, an oil temperature detection unit 50b is arranged, which detects the oil temperature TÖl at the outlet of the oil sump 11. Alternatively, the oil temperature detection unit can also be provided, for example, at the output of the oil cooler 21.

In the present embodiment, the control device 30 defines the air temperature TLuft as the primary control variable and the oil temperature TÖl as the secondary control variable for actuating the fans 40 according to the detected air temperature TLuft and/or oil temperature TÖl.

Figure 2:
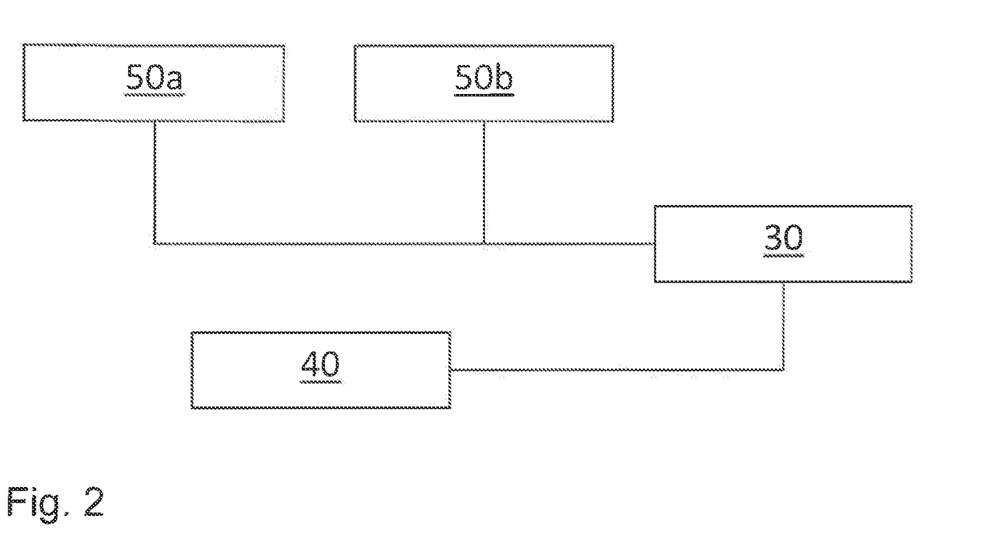
FIG. 2 shows in detail a schematic concept sketch for actuating a cooling device that can be applied to a compressor system according to FIG. 1.

FIG. 2 shows a schematic concept sketch of the actuation of the fans 40. In the embodiment shown, the values of the air temperature TLuft as the primary control variable and the oil temperature TÖl as the secondary control variable currently detected by means of the air temperature detection unit 50a and the oil temperature detection unit 50b are transmitted to the control device 30. The transmission can be wired as well as wireless. Even if the simultaneous forwarding of both signals takes place here, for example, the secondary control variable may only be detected and/or transmitted as required. In one variant, for example, the secondary control variable is only detected and transmitted if the primary control variable is less than or equal to a predetermined upper primary control limit.

The control device 30 then selects the control variable to be used or the control variables to be used and/or the applicable transfer function depending on the values of the primary control variable and/or secondary control variable. Accordingly, the control variable and/or the actuator for actuating the fans 40 are dynamically adjusted.

Figure 3:
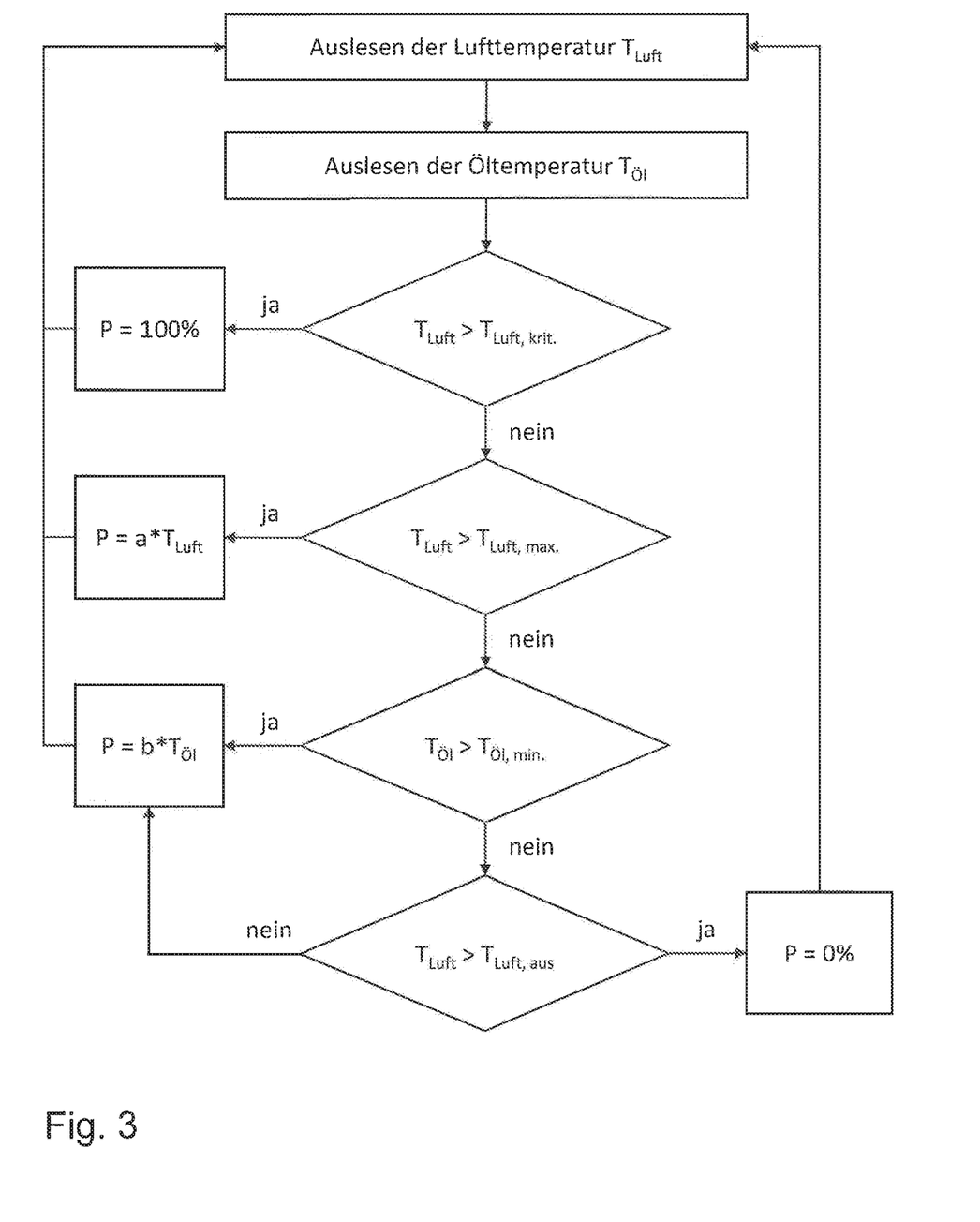
FIG. 3 shows in detail a flowchart for actuating a cooling device that can be applied to a compressor system according to FIG. 1.

The actuation with dynamic adjustment of the control variable and/or the actuator for the actuation of the fans 40 is explained by way of example based on the flowchart shown in FIG. 3. For this purpose, the air temperature TLuft is read out as the primary control variable and the oil temperature TÖl as the secondary control variable. As decision criteria for the selection of the control variable and transfer function of the actuator to be used specifically for the actuation, a critical upper air temperature limit TLuft, crit. as a critical upper primary control variable limit, an upper air temperature limit TLuft, max. as an upper primary control variable limit, an oil temperature limit TÖl, min. as a secondary control variable limit and a lower air temperature limit TLuft, aus as a lower primary control variable limit are stored in the controller. The critical upper air temperature limit TLuft, crit. corresponds to an air temperature that can pose a risk to the compressor system, so that maximum cooling is required here. Accordingly, the critical upper air temperature limit TLuft, crit. is greater than the upper air temperature limit TLuft, max., which requires cooling, but does not have to be carried out at maximum power. The oil temperature limit TÖl, min corresponds to the minimum temperature of the oil and the lower air temperature limit TLuft, aus corresponds to the maximum air temperature up to which the fans 40 may be switched off.

If the detected air temperature TLuft is greater than the critical upper air temperature limit TLuft, crit. the fans 40 are each operated at maximum power. The power P as a controlled variable results from P=100%, wherein here the 100% refers to the technically specified maximum power.

However, the 100% can also refer to a different predetermined maximum value that is not predetermined by the fan 40 itself. The power P of the fans 40 refers in this exemplary embodiment to the revolution rate of the fan and thus to the cooling air volume rate provided by the fans 40.

If the critical upper air temperature limit TLuft, crit. is not exceeded, it is queried whether the air temperature TLuft is greater than the upper air temperature limit TLuft, max. If this is the case, the fans 40 are each operated with a power proportional to the air temperature TLuft. The controlled variable P thus results analogously from a transfer function corresponding to P=a*TLuft. If the fans 40 are to be actuated differently, the proportionality factor a can be selected differently for each fan as required. In addition, the transfer function may also have an additional summand or subtrahend, such as P=a*TLuft+offset, for example, in order to be able to provide a base power or a power reduction.

If the air temperature TLuft does not exceed the upper air temperature limit TLuft, max., the oil temperature TÖl is used to actuate the fans 40. If the oil temperature TÖl is greater than the oil temperature limit TÖl, min., the fans 40 are each operated with a power proportional to the oil temperature TÖl. The controlled variable P thus results analogously from a transfer function corresponding to P=b*TÖl. Here too, the fans 40 may be actuated with different power by selecting the proportionality factor b and/or the transfer function may have an additional summand or subtrahend.

If the oil temperature TÖl is not greater than the oil temperature limit TÖl, min., the previously detected air temperature TLuft is additionally included in the evaluation by the control device 30. If, in such a case, the air temperature TLuft is greater than or equal to the lower air temperature limit TLuft, aus, the fans 40 are actuated according to the actuation if the oil temperature is greater than the oil temperature limit TÖl, min. However, if in such a case the air temperature TLuft is less than the lower air temperature limit TLuft, aus the fans 40 are switched off.

Even if the flowchart shows a serial query, the evaluation can also be carried out in parallel by assigning the detected primary and secondary control variables to a category which can be assigned by the respective queries, for example by temperature measurement and comparison with table values. In the actuation result, the parallel evaluation is equivalent to serial evaluation. However, the serial query makes it possible, for example, that the secondary control variable only has to be read out as required.

The invention is also not limited to the embodiments described. Even if the cooling device has been described based on the use of fans, other cooling devices can be used, such as heat exchangers, past and/or through which the air in the compressor system can be conveyed. The cooling capacity of the heat exchangers can be adjusted by their positioning, orientation and/or by the cooling fluid volume flow rate, the cooling fluid volume flow temperature for the heat transfer media flowing through the heat exchanger and/or a change of the heat transfer medium.

REFERENCE CHARACTER LIST

1 compressor system
10 compressor
10a output (air)
11 oil sump
11a output (oil)
20 aftercooler
21 oil cooler
22 external oil circuit
23 internal oil circuit
24 intercooler
30 control device
40 fans
41 cooling air volume flow
50a air temperature detection unit
50b oil temperature detection unit
60 process air flow
$T_{Luft}$ air temperature
$T_{Luft, aus}$ lower air temperature limit
$T_{Luft, crit.}$ critical upper air temperature limit
$T_{Luft, max.}$ upper air temperature limit
$T_{Öl}$ oil temperature
$T_{Öl, min}$ oil temperature limit

The invention claimed is:

1. A compressor system comprising:
a compressor;
a cooling device coupled to the compressor; and
a control device configured to actuate the cooling device independently of the operation of the compressor and to dynamically adjust a control variable of an actuator and/or to dynamically adjust the actuator for actuating the cooling device,
wherein the control device is configured to receive at least two control variables, wherein one of the at least two control variables is defined as a primary control variable and an other of the at least two control variables is defined as a secondary control variable for actuating the cooling device based on the primary control variable and/or the secondary control variable, and
wherein the control device is further configured to:
actuate the cooling device based on the primary control variable in response to the primary control variable being greater than a predetermined upper primary control variable limit; and
actuate the cooling device based on the secondary control variable in response to the primary control variable being less than the predetermined upper primary control variable limit and the secondary control variable being greater than a predetermined secondary control variable limit; and/or
actuate the cooling device based on the primary control variable and the secondary control variable in response to the primary control variable being less than or equal to the predetermined upper primary control variable limit and the secondary control variable being less than the predetermined secondary control variable limit.

2. The compressor system of claim 1, wherein the control device is further configured to specify a cooling fluid volume flow rate.

3. The compressor system of claim 1, wherein the control device is further configured to actuate the cooling device such that the cooling device is operated at maximum power in response to the primary control variable being greater than a critical upper primary control variable limit, which is greater than the predetermined upper primary control variable limit.

4. The compressor system of claim 1, wherein the control device is further configured to actuate the cooling device such that, in response to the primary control variable being greater than the predetermined upper primary control variable limit, the cooling device is operated, at most, with a power proportional to the primary control variable until reaching its maximum power.

5. The compressor system of claim 1, wherein the control device is further configured to actuate the cooling device such that:
- in response to the primary control variable being less than or equal to the predetermined upper primary control variable limit and the secondary control variable being greater than the predetermined secondary variable limit, the cooling device is operated, at most, with a power proportional to the secondary control variable until reaching its maximum power, or
- in response to the secondary control variable being less than the predetermined secondary control variable limit and the primary control variable being greater than or equal to a predetermined lower primary control variable limit.

6. The compressor system of claim 1, wherein the control device is further configured to actuate the cooling device such that the cooling device is switched off in response to the secondary control variable being less than or equal to the predetermined secondary control variable limit and the primary control variable being less than a predetermined lower primary control variable limit.

7. The compressor system of claim 1, further comprising at least one air temperature detection unit, which detects an air temperature, and at least one oil temperature detection unit, which detects an oil temperature, and which is connected to the control device, wherein the control device is configured to define the detected air temperature as the primary control variable and the detected oil temperature as the secondary control variable and/or vice versa.

8. The compressor system of claim 7, wherein the air temperature detection unit and the oil temperature detection unit are arranged at a respective output of the compressor.

9. The compressor system claim 1, wherein the compressor system is an oil-lubricated screw compressor.

10. A method for controlling a cooling device of a compressor system that includes a compressor, a cooling device coupled to the compressor, and a control device configured to actuate the cooling device independently of the operation of the compressor and configured to dynamically adjust a control variable of an actuator and/or to dynamically adjust the actuator for actuating the cooling device, the method comprising:
- detection of at least two control variables; and
- control of the cooling device based on the detected control variables,
- wherein the control variable for the actuator and/or the actuator for actuating the cooling device is dynamically adjusted depending on the detected control variables, wherein the control device:
  - defines one detected control variable of the at least two control variables as the primary control variable and an other detected control variable of the at least two control variables as the secondary control variable;
  - actuates the cooling device based on the primary control variable in response to the primary control variable being greater than a predetermined upper primary control variable limit;
  - actuates the cooling device based on the secondary control variable in response to the primary control variable being less than or equal to the predetermined upper primary control variable limit and the secondary control variable being greater than a predetermined secondary control variable limit, and/or
  - actuates the cooling device based on the primary control variable and the secondary control variable in response to the primary control variable being less than or equal to the predetermined upper primary control variable limit and the secondary control variable being less than the predetermined secondary control variable limit.

11. The method of claim 10, wherein the control device actuates the cooling device to:
- operate at maximum power in response to the primary control variable being greater than a critical upper primary control variable limit, which is greater than the predetermined upper primary control variable limit,
- operate at most at a power proportional to the primary control variable until its maximum power is reached in response to the primary control variable being greater than the predetermined upper primary control variable limit,
- operate at most at a power proportional to the secondary control variable until its maximum power is reached in response to the primary control variable being less than or equal to the predetermined upper primary control variable limit and the secondary control variable being greater than the predetermined secondary control variable limit or in response to the secondary control variable being less than or equal to the predetermined secondary control variable limit and the primary control variable being greater than or equal to a predetermined lower primary control variable limit, and/or
- switch off in response to the secondary control variable being less than or equal to the predetermined secondary control variable limit and the primary control variable being less than a predetermined lower primary control variable limit.

12. A non-transitory computer readable medium including a program code, which, when executed on a data processing device, causes the data processing device to carry out the method of claim 10.

* * * * *